July 29, 1958 W. SCHAEFFER 2,845,166
BELT CONVEYOR
Filed Oct. 2, 1951 3 Sheets-Sheet 1
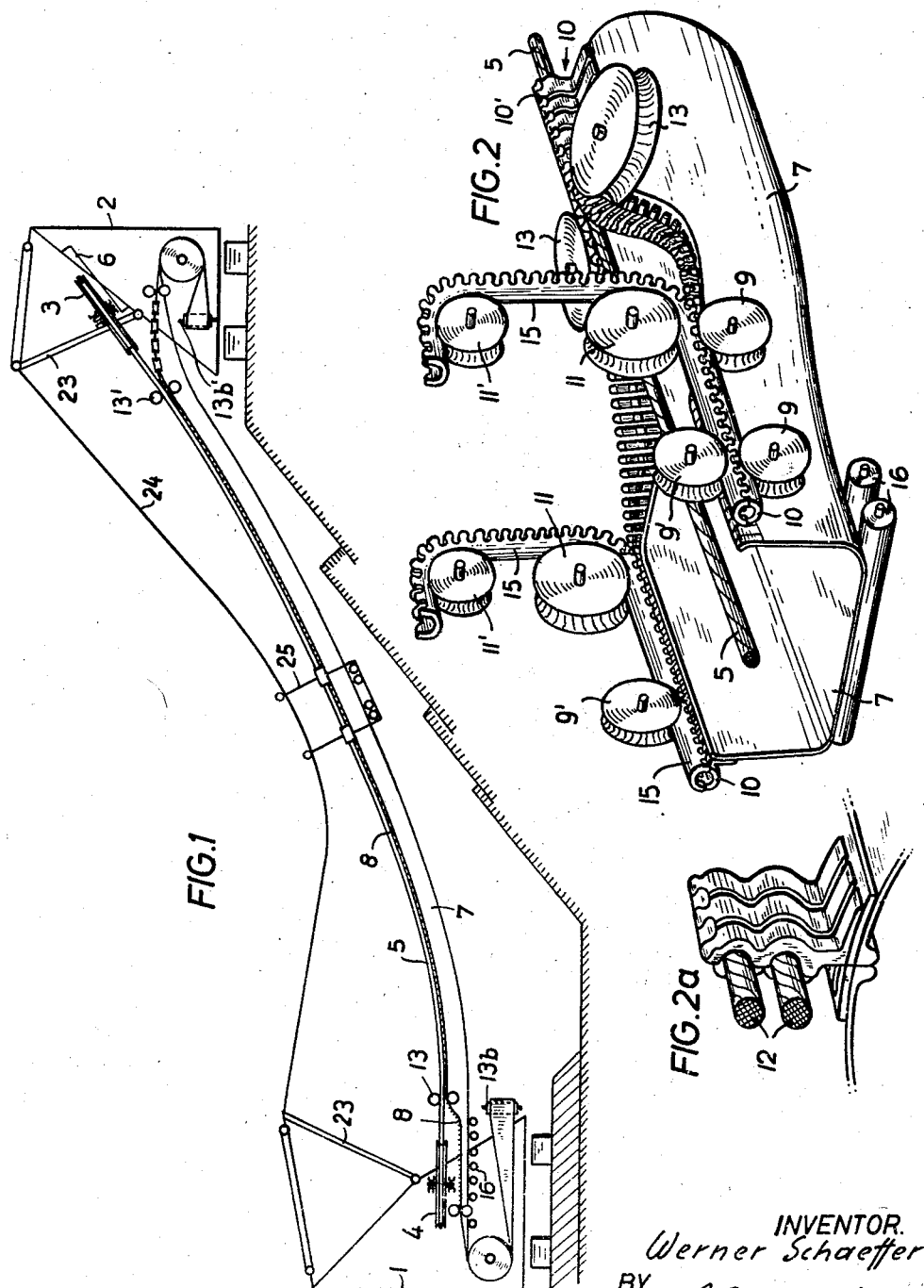
INVENTOR.
Werner Schaeffer
BY Richard Good
Ag't July 29, 1958 W. SCHAEFFER 2,845,166
BELT CONVEYOR
Filed Oct. 2, 1951 3 Sheets-Sheet 2
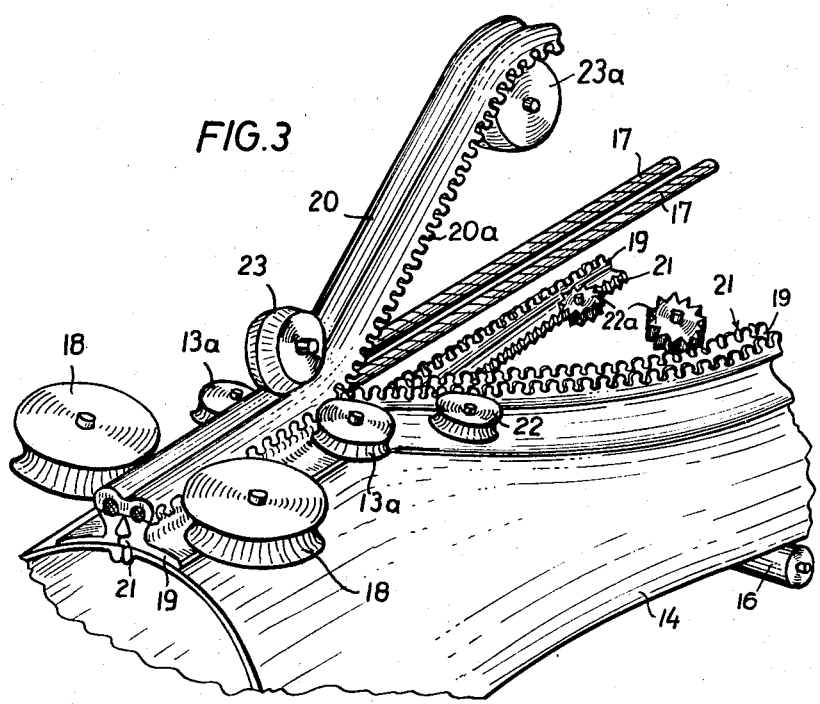
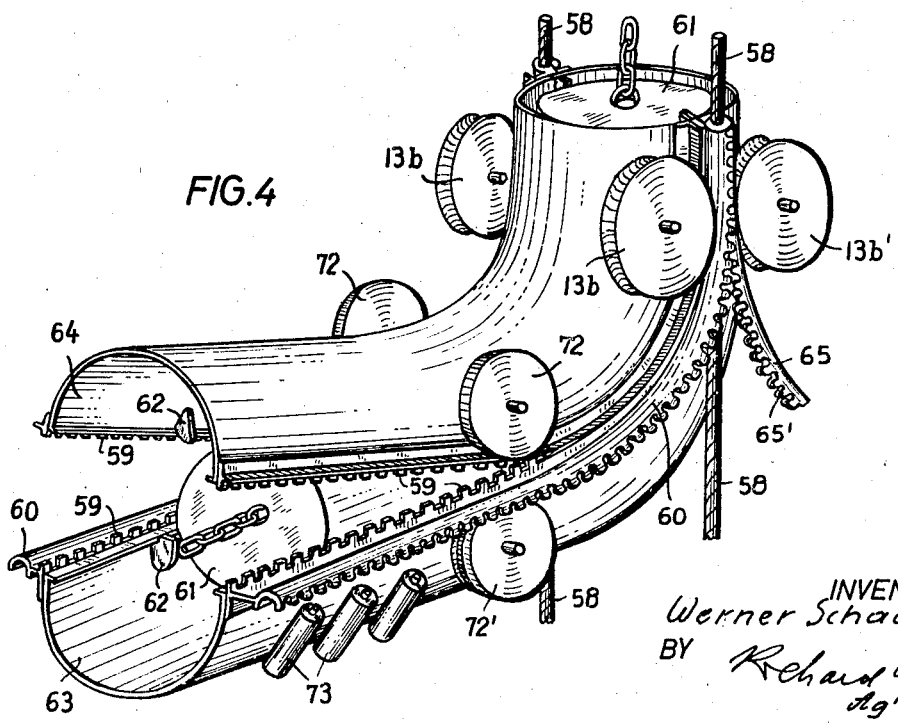
INVENTOR.
Werner Schaeffer

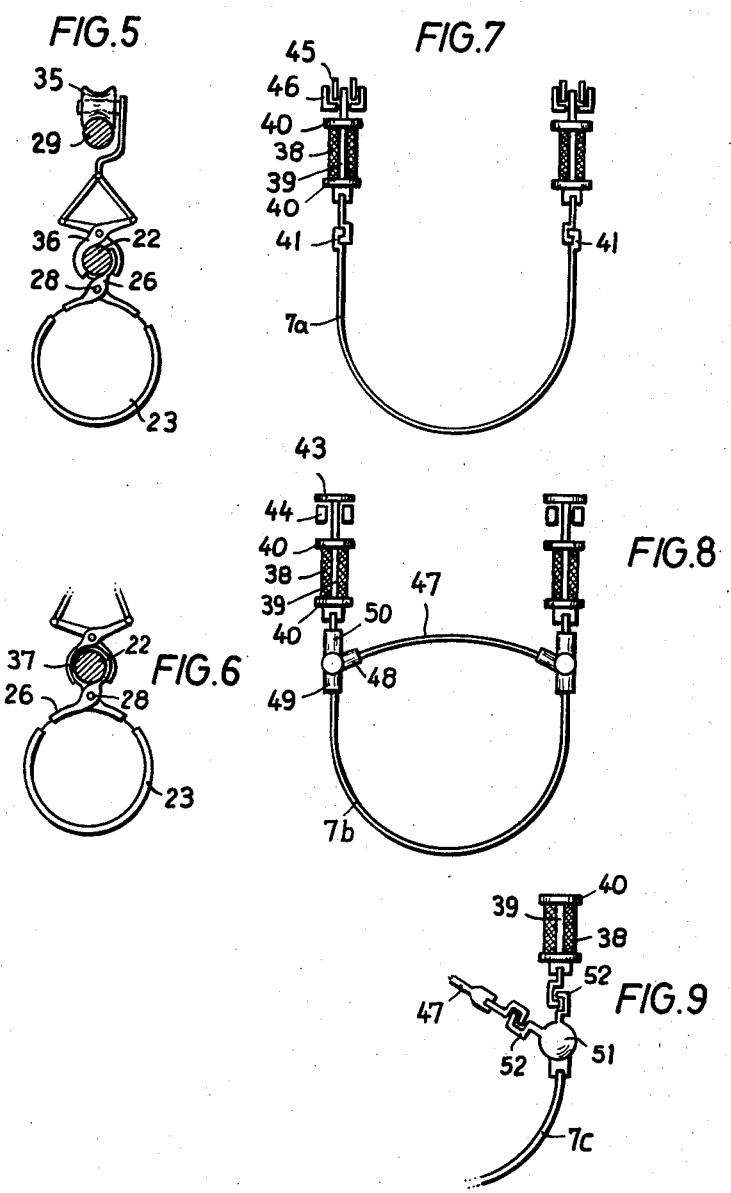

United States Patent Office 2,845,166
Patented July 29, 1958

2,845,166

BELT CONVEYOR

Werner Schaeffer, Hoverweg, Hoffnungsthal, Germany

Application October 2, 1951, Serial No. 249,237

Claims priority, application Germany October 16, 1950

23 Claims. (Cl. 198—129)

This invention relates to a belt conveyor, especially one for bulk material.

The most efficient and useful medium of conveying goods today is the belt conveyor. However, its application in different industries is hampered by certain inherent restrictive characteristics: A conventional belt conveyor cannot climb steep slopes of even moderate length; it must run in a straight line; and it is rather severely limited in the length of the belt by the number and strength of the cloth linings or layers.

The belt in a belt conveyor has to keep the goods to be conveyed together and has to carry same, and it must also transmit the driving and hauling forces.

The primary object of my invention is to generally improve belt conveyors for bulk material, particularly with a view to overcoming the above referred to drawbacks.

In known belt conveyors, hauling ropes are embedded in the cloth lining in order to obtain a greater belt length. Such belts, however, have a relatively short useful life. Attempts to overcome the limitations of the known belt conveyors by using continuous conveying means, such as steel link belts, while successful, have not been satisfactory because any gain in length has only been obtained at the cost of decreased capacity, high weight, high first cost, high rate of wear, and noisy operation. Also, these conveying means are not suitable for certain applications, such as the removal of rubbish and coal in the mining of lignite in open cuts, especially at freezing temperatures. It is also known to provide conveyor belts for very light bulk material, such as tobacco, with a slide fastener along the edges. Such a belt forms a tube that, when moving in curves, is exposed to high shear stresses and upsetting actions and can, therefore, be considered only for small sectional areas of the transported material and for relatively short distances.

An important object of my invention is to provide a conveyance for carrying heavy voluminous bulk material over large distances along a track that may be curved and steeply ascending.

To the accomplishment of the foregoing and other objects which will hereinafter appear, my invention consists in the conveyor elements and their relation one to the other, as hereinafter are more particularly described in the specification and sought to be defined in the claims. The specification is accompanied by drawings in which:

Fig. 1 schematically illustrates a suspended (aerial) belt conveyor embodying features of my invention;

Fig. 2 is a perspective view of a belt conveyor in accordance with the invention, the view being explanatory of the closing and opening of a tubular or similar conveyor belt and of its being simultaneously connected with, or disconnected from, a hauling rope;

Fig. 2a is a perspective view of a detail, illustrating a conveyor belt and two hauling ropes in connected condition;

Fig. 3 is a perspective view of a modified belt conveyor;

Fig. 4 is a perspective view of another modification of a belt conveyor;

Fig. 5 illustrates suspension means for a belt conveyor;

Fig. 6 illustrates modified suspension means;

Fig. 7 illustrates a supported belt conveyor, the belt being a trough belt and the ropes used being flat instead of round;

Fig. 8 shows a modified flat rope and trough belt conveyor; and

Fig. 9 illustrates a modified trough belt.

Referring to the drawings in greater detail, and having first reference to Fig. 1, a tower 1, 2 is movably positioned on the working floor of a coal seam and on the rubbish tip, respectively. The latter tower may also be in an intermediate position. An endless flat-plaited rope, a triple-strand rope or any other suitable rope 5 runs over a drive pulley 3 and a return pulley 4, held by these towers. To compensate for length and height differences, the pulleys are mounted to be longitudinally movable in the planes which correspond to the natural slack of the rope, so that the rope will run over the sheaves without buckling. I prefer to provide an external edge of each tower as a trackway 6 for the pulleys. The rope serves as carrying and hauling means for a conveyor belt 7 between the drive and return pulleys, and is disengagingly connected with the belt by means of rows of fastening or interlocking members 8 provided on the edges of the belt. When rope and belt are being connected by the interlocking members, the edges of the otherwise open conveyor belt are closed to form a tubular structure. Rope and belt are shown connected between the points 13 and 13'. The separation takes place before the rope reaches the drive pulley 3 and the return pulley 4. While separated from the hauling rope, the conveyor belt is ready either for loading at the loading station normally at the return station (return pulley 4), for instance, on the coal bed, or for unloading at the unloading station, for instance, on the rubbish tip (near the drive pulley 3). In the separated condition, the conveyor belt is guided and supported by rollers, a roller track 16, a steel link belt, or specially adapted rollers 9. After the closed belt has been opened at the return station and after the opened belt has changed its direction at 13b it is closed and united with the rope at 13. The closed belt and the rope travel in connected relation to 13' where they are again separated. The belt opens and, after the change in direction at 13b', it is closed again and again united with the rope to travel back in connected condition. The loading of the conveyor belt takes place after its opening, while shown to be supported by the roller track 16, and the discharge of goods carried by the belt takes place while the belt is shown to be supported by the rollers 9.

In the form illustrated in Fig. 2, the outer edges of the belt 7 have secured thereto interlocking members 10 made of steel or, preferably, plastic material or rubber. The heads 10' of the interlocking members have the shape of half-tubes, the inner diameter of which corresponds to the diameter of the carrying and hauling rope 5. The interlocking members of one row form the mirror images of the members of the other row. The interlocking members are intended to close the open edges of the belt, to envelop the rope from below and above, respectively, and to connect the closed or tubular belt with the rope. For this purpose, the half-tube-shaped heads of the interlocking members carry interconnecting elements (projections and recesses) similar to those on slide fastener members. The open rows of interlocking members are led towards each other by means of profiled rolls 13. When passing over these rolls in closing direction, the half-tubes are first brought into positions in which they are ready for interlocking, and then caused to engage each other, the engagement taking place around the rope. A sleeve is thus formed which extends over the entire length of the closed belt, and along which length the belt is suspended from the rope. In case of heavy loads, special means may be used to increase the friction between the rope and said sleeve, for instance, a rubber band. For extremely heavy loads, the rope may be given the profile of transverse serrations, in which case the inner surface of the sleeve is shaped matingly.

To simplify the guiding and interlocking of the rows of the interlocking members 10 before they meet the rope, each of the rows of half-tubes 10', while still disengaged and moving over guide rolls 9, is covered by a blank cover 15 which ordinarily contains stiffening means over the entire cross section. Thus, the open half-tubes on each belt edge are covered by a flexible band (cover 15) which, together with the open half-tubes, is guided by the profiled rolls 9 and 9'. The covers 15 carry the open belt and protect the members 10 against contamination; they are deflected by rolls 11 and are guided, while detached, by rolls 11'.

With installations of a larger size, I use several carrying and hauling ropes running in parallel relation over multiple sheaves (see, for instance, the ropes 12 in Fig. 2a).

In the construction of Fig. 3, two ropes 17 are used. There is a single cover band 20 provided with fastener members 20a to cooperate with fastener members 19 on both edges of the conveyor belt 14. The fastener members 19 are associated with fastener members 21 which are likewise attached to the belt edges and which engage each other. The interlocking of the fastening members 20a and 19, on the one hand, and 21, 21 on the other hand, closes the belt edges, secures the cover band to the belt, and encloses the two ropes 17. The rolls 18 guide the closed portion of the belt, whereas the rolls 22 and 22a guide the open belt edges. The rolls 13a act as opening and closing rolls, and the rolls 23 and 23a guide the disengaged cover band.

The form of my invention using double ropes, as shown, for instance, in Fig. 3, has the further advantage that the closure of the tubular belt 14 may be provided with an elastic safety device against overloading with pieces of excessive size. Before meeting the ropes 17, the tubular belt is moved over a number of profiled elastic pressure rolls which yield under the pressure of overlarge pieces and will cause the belt to stay open, and this will stop the conveyor by releasing automatic devices of conventional design.

My rope-belt conveyor can be used not only for underground hauling but also in shafts. It permits with great advantage continuous transportation in a shaft to replace continuous feeder service by a belt conveyor in connection with intermittent shaft haulage. This makes possible a substantial reduction in the shaft section, the elimination of large pit heads, of the joining underground stations, and of the places where the tipping is done with the conventional transportation by mine cars. For a shaft conveyor, either round or flat ropes may be used together with the tubular belt. The shaft conveyor belt with round ropes is preferably designed so that the tubular belt is guided between two lateral round ropes 58 (see Fig. 4). For this purpose, the belt is made from two halves 63 and 64. Each edge of the half-tubes 63, 64 is provided with interlocking members 59, 60. The interlocking members 59 serve to close the belt edges, and the interlocking members 60 cooperate with the locking members 65' of cover bands 65 to form guiding sleeves which enclose the ropes 58. It is necessary that the enclosed round ropes and the inner surfaces of the surrounding interlocking members be provided with transverse grooves to increase friction. The ropes with their cover bands 65 are guided by suitable devices in the shaft.

In vertical operations, chains with transverse discs 61 or similar devices which prevent the goods from flowing downwardly must be provided. The efficiency of such a disc chain can be improved by ribs 62 projecting from the fastening members inwardly and supporting the discs. This frees the chain partly from the load, making it possible for the chain just to control the distance between the discs.

For instance, for unloading, the belt (Fig. 4) is opened with the aid of profiled rolls 72 and 72'. The belt half 63 is shown in Fig. 4 to be guided over rollers 73. The open half-belts are turned around, closed by the rolls 72 and 72', returned to the shaft, and connected to the returning ropes by means of the rolls 13b and 13b'.

In Figs. 5 and 6, the fastening members 26 of the belt 23 are designed to swing about 28 and to clasp the hauling rope 22. The rope and belt are shown to be suspended from a fixed cable 29 by means of traveling crabs 35. The rope and belt are attached to the traveling crabs by scissorlike connectors 36 and 37, respectively, which connectors, too, clasp around the rope 22. According to Fig. 5, the connectors 36 clasp the rope in the gap between the members 26, and in accordance with Fig. 6, the connectors envelop the members 26.

Instead of round ropes, flat ropes may be used. Embodiments of my invention using flat ropes for suspended and supported rope-belt conveyors are described hereinafter.

A pair of flat ropes 38 (Fig. 7) is to be led edgewise over the drive pulley 3 and the return pulley 4 in the tower 2 and 1, respectively, shown in Fig. 1, in the same way as has been described with respect to round ropes. The edges of the belt 7a are disengaged from the hauling ropes 38 at the driving and return stations in order to protect them against bending stresses and to take care of the different rate of wear of the component parts. The connection between the haulage and the belt edge is preferably achieved by means of a slide fastener. According to the structural characteristics of flat ropes, the following connection is used to the best advantage: Instead of using conventional sewing wires, flat elliptic members 39 of steel or plastic are used for holding the ropes together. These members carry flangelike parts 40 extending over both rope edges. These flanges serve as guides when the ropes pass over the drive and return pulleys and also prevent sliding of the ropes from the driving pulleys. On the inside, the members 39 terminate in slide fastener members 41. The opening and closing sliders in this case are designed so that the fastener is opened by bending not around its high edge, but around the flat edge. In this way the belt is disengageably linked with the hauling ropes. On the outside, the flat members also extend beyond the ropes and preferably form guiding and carrying elements. These extensions carry double rolls 45 supported in ball bearings and running over fixed guide rails 46. Supporting rolls for the sagging troughlike belt proper are unnecessary as long as it is connected to the ropes. When disconnected, the belt must be guided by supporting rollers or roller tracks. This type of rope-belt is suitable for suspended service or may be used in a supported type of belt conveyor for long distances. It will handle curves and also moderate slopes due to its troughlike shape. The efficiency on steep slopes can be improved by inserting a device to take goods along, such as a chain with transverse discs as described above, when the returning stringer is not conducted overhead.

This type of rope-belt conveyor becomes suitable for service over steep slopes when the belt forms a tube which completely surrounds and holds fast the goods during transportation. This may be achieved by various means.

According to Fig. 8, the belt 7b of the rope-belt conveyor is closed by a cover 47', the edges of which are provided with slide fastener members 48. By means of a three-way slider and by giving the interlocking members a suitable shape, the members 49, 48 and 50 attached to the belt 7b, the cover 47, and the hauling ropes, respectively, are made to interlock alternately.

Instead of a three-way slide fastener which opens all connections, I may use a closing arrangement comprising a closing device 51 (Fig. 9) fixedly connected with the belt 7c and carrying two arms 52, each supplied with simple slide fastener members and a corresponding slider.

It is believed that my invention, as well as the construction and operation of the forms shown for practicing the invention, and the many advantages thereof, will be understood from the foregoing detailed description. As a general observation, I wish to add that since the weight of the transported goods and the main portion of the hauling and driving forces are borne by the rope or ropes, the belt itself can be of relatively light material which permits a substantial increase in the belt length.

With the construction according to my invention, it is possible to transport under any angle.

The tubular belt, like the interlocking means, is preferably made from synthetic plastic materials, such as polyvinyl chloride. This material is very well suited for use as an elastic carrier and has the added advantage that the plastic interlocking members may be attached by heat sealing. The width of the conveyor belt becomes thus independent of the width of available vulcanizing presses, and repairs can also be easily performed by heat sealing.

If it is desired to use a rubber belt, the belt is to be designed according to the stresses it will have to undergo, these stresses being different from those in a conventional rubber conveyor belt. In a rubber conveyor belt of conventional design, the warp threads of fabric layers usually have twice the tensile strength of the filling threads. With the tubular belt of my invention which does not transmit any tensile stresses, the filling threads are given a higher tensile strength than the warp threads. It is also advantageous to choose a diagonal weave with threads of equal strength.

The belt may be unloaded not only at the tower near the dumping place, but also at any desired point between the towers. For this purpose, one or more adjustable cables 24 are drawn between booms 23 to movably carry an intermediate discharge station 25 (see Fig. 1). The tubular belt and hauling rope are moved over this intermediate discharge station where in the manner described hereinbefore the belt 7 is disconnected from the rope 5, and the opening, discharge, the reclosing, and the reconnection to the rope 5 take place.

For very steep slopes and irregular loading of the belt, the goods may be prevented from sliding inside the belt by providing discs transversely mounted on a chain which is separately and synchronously driven, or by providing similar devices. To protect the belt against oversize pieces in the load, suitable devices for sorting and removing such obstructions, such as a grate, a revolving table with a rake, a screen, etc., and a short tubular loading belt are provided in front of the loading station. A small storage bin may also be provided, the discharge of which controls irregularities originating from the excavator.

Where it is desirable to guide the tubular belt sporadically, for example, prior to the connection with the rope, but especially where it is necessary to guide the belt, profiled supporting rolls are of advantage. Such profiled rolls guide the carrying and hauling rope in its sleeve of interlocking members. If the load of my rope-belt conveyor is to vary over the length of the conveyor, the profiled rolls are preferably mounted on the supporting structure so as to be swung out of their position. The guided rope-belt conveyor according to my invention is of particular advantage when used along curves below ground. The guiding elements (carrying rolls or guide rails) are preferably then fastened to the coping in the gallery. This causes minimum obstruction on the working level.

My suspended rope-belt is very well suited for the conveyance of bulk material over large distances. It may be suspended from towers or poles with crosspieces set at great distances, and may be conducted overhead over all obstacles of the terrain, such as roads, railroads and settlements. On the crosspieces, the tubular belt is guided as described above. It is thus possible in the mining industry to connect in a most economical way shipping, consumption, or working places with distant mines. It is also possible, if desired, to use the returning stringer for the transportation of refuse. My conveyance has the added advantage of protecting the load against climatic influences, of avoiding reloading and losses during the transportation, of noiseless operation, a low rate or wear, low cost of labor and high speed. My belt conveyor makes it possible to convey, for instance, rough coal from the mine to the place of utilization for wet pressed briquettes over any distances without unloading and reloading, whereby the hauling means may be changed repeatedly. Another example of the usefulness of my belt conveyor is that briquettes may be transported from the loading berth of the briquette plant to port loading installations without intermediate unloading.

Depending on the application, the rope-belt conveyor of my invention may be modified suitably, but it will always be based on a combination of a belt with a round or flat rope, and may be used for:

(A) Suspended service between fixed or portable towers as an aerial conveyor;

(B) Where a slack of the aerial rope and belt is not permissible as a supported conveyor.

My rope-belt conveyor has been described mainly with respect to its application to open cut lignite mining. It should, however, be understood that the application of the present conveyor is not limited to this branch of the mining industry. It can be applied without any essential changes to the industrial transportation of all kinds of bulk materials where there are similar problems, for instance, coal mines, underground transportation, transportation of bulk materials over large distances, etc.

In the open cut mining of lignite it is, for instance, necessary to transport barren rock freed by mining machines over and across workings to the waste tip located in a worked over section. It may be desirable to overcome differences in level of five hundred feet or more. Removing coal from surface mining presents similar problems. To solve this kind of problems, I prefer to use a suspended rope-belt conveyor as shown in Figs. 1 and 1a.

It will be apparent that while I have shown and described my invention in a number of forms, many changes and modifications may be made without departing from the spirit of the invention defined in the following claims.

I claim:

1. Belt conveyor for bulk material, comprising at least one endless belt, at least a single rope extending along the belt and serving as a power-transmitting and hauling means, and fastening means attached along edges of the belt, the fastening means of one edge being shaped to interlock with the fastening means of another edge, the fastening means of both edges, when interlocked, joining the edges of the belt to the rope.

2. In the conveyor according to claim 1, rolls profiled to conform to the outer contour of the fastening means, and arranged to effect closing and opening of the fastening means.

3. In the conveyor according to claim 1, the fastening means of two edges of the belt, when interlocked, joining the edges of the belt.

4. In the conveyor according to claim 1, the fastening means including an endless band and individual fastening members integrally formed with said band.

5. In the conveyor according to claim 1, an endless series of fastening members forming the fastening means.

6. In the conveyor according to claim 1, profiled rolls from which the belt is suspended by means of its fastening means.

7. In the conveyor according to claim 1, a covering, and fastening means provided longitudinally of said covering, the fastening means of the covering and belt being shaped to join the belt and rope.

8. In the conveyor according to claim 1, the fastening means including individual interconnecting members, said members of two edges of the belt, when interconnected, being of pincer shape, the jaws of the pincers pivoting about an axis formed by the interconnecting members and being shaped to clasp around the rope.

9. In the conveyor according to claim 1, at least one single flat rope, and fastening means attached longitudinally of said flat rope, the second named fastening means being shaped to cooperate with the first named fastening means and to join the edges of the belt and the flat rope.

10. In the conveyor according to claim 1, posts, and drive and return apparatus mounted on said posts, said rope being freely suspended between the drive and the return apparatus.

11. In the conveyor according to claim 1, a track extending along said rope, crabs arranged to travel on said track and supporting members suspended from said crabs and carrying the rope.

12. In the conveyor according to claim 1, the belt being of tubular shape, when closed, two flat ropes running laterally of the closed belt, three-way fastening means for selectively joining the sections, and the ropes with the sections, members disposed within the ropes and being provided with flanges, the flanges holding the longitudinal rope strands together and serving as guide and supporting means for the ropes, discs spacedly arranged within the closed belt, projections provided on the fastening means of the sections to support said discs.

13. In the conveyor according to claim 1, the rope having a grooved surface, the rope-enclosing surface of the fastening means being matingly shaped.

14. In the conveyor according to claim 7, the fastening means of the belt being shaped to join the edges of the belt without engaging the fastening means of the covering and without joining the belt and rope.

15. In the conveyor according to claim 7, rolls profiled to conform to the outer contour of the fastening means of the covering and belt, and arranged to effect closing and opening of the fastening means.

16. In the conveyor according to claim 9, the belt comprising a carrier section and a cover section, both sections having fastening means attached to their edges, the latter fastening means being shaped to be interlocked with each other and with the fastening means of the rope, and a member to selectively disengage or engage the fastening means.

17. In the conveyor according to claim 9, guide pulleys for the rope, means to support the rope, and members extending along the rope and forming guiding and supporting parts at the other edge of the rope.

18. In the conveyor according to claim 9, drive and return pulleys, said rope pointing with its edges upwardly and downwardly, members extending along the rope and being provided with flanges at both edges of the rope, the flanges serving to guide over said pulleys and holding the longitudinal rope strands together.

19. In the conveyor according to claim 10, at least one more cable drawn between the posts, and in intermediate unloading station supported by said additional cable.

20. In the conveyor according to claim 11, a fixed cable serving as said track, and clawlike supporting members gripping around the rope.

21. Belt conveyor for bulk material, comprising an endless tubular belt, two ropes extending laterally and in opposed relation along the tubular belt, the belt being formed by two sections, and fastening means attached along the edges of each section, the fastening means of one section interlocking with the fastening means of the other section, the fastening means of both sections, when interlocked, joining the belt to the ropes.

22. In the conveyor according to claim 21, the belt being formed by two half-tube shaped sections, two coverings arranged to help enclose the ropes and being provided with fastening means, the fastening means of one of said sections being adapted to interlock with the fastening means of the other section and the fastening means of the coverings, thus simultaneously effecting the joining of the sections and of the tubular belt to the ropes rolls profiled to effect closing and opening of the fastening means.

23. In the conveyor according to claim 22, discs spacedly arranged within the closed belt, projections provided on the fastening means of the sections to support said discs.

References Cited in the file of this patent

UNITED STATES PATENTS

| | | |
|---|---|---|
| 2,013,242 | Johns | Sept. 3, 1935 |
| 2,212,024 | Johns | Aug. 20, 1940 |